Patented Sept. 5, 1922.

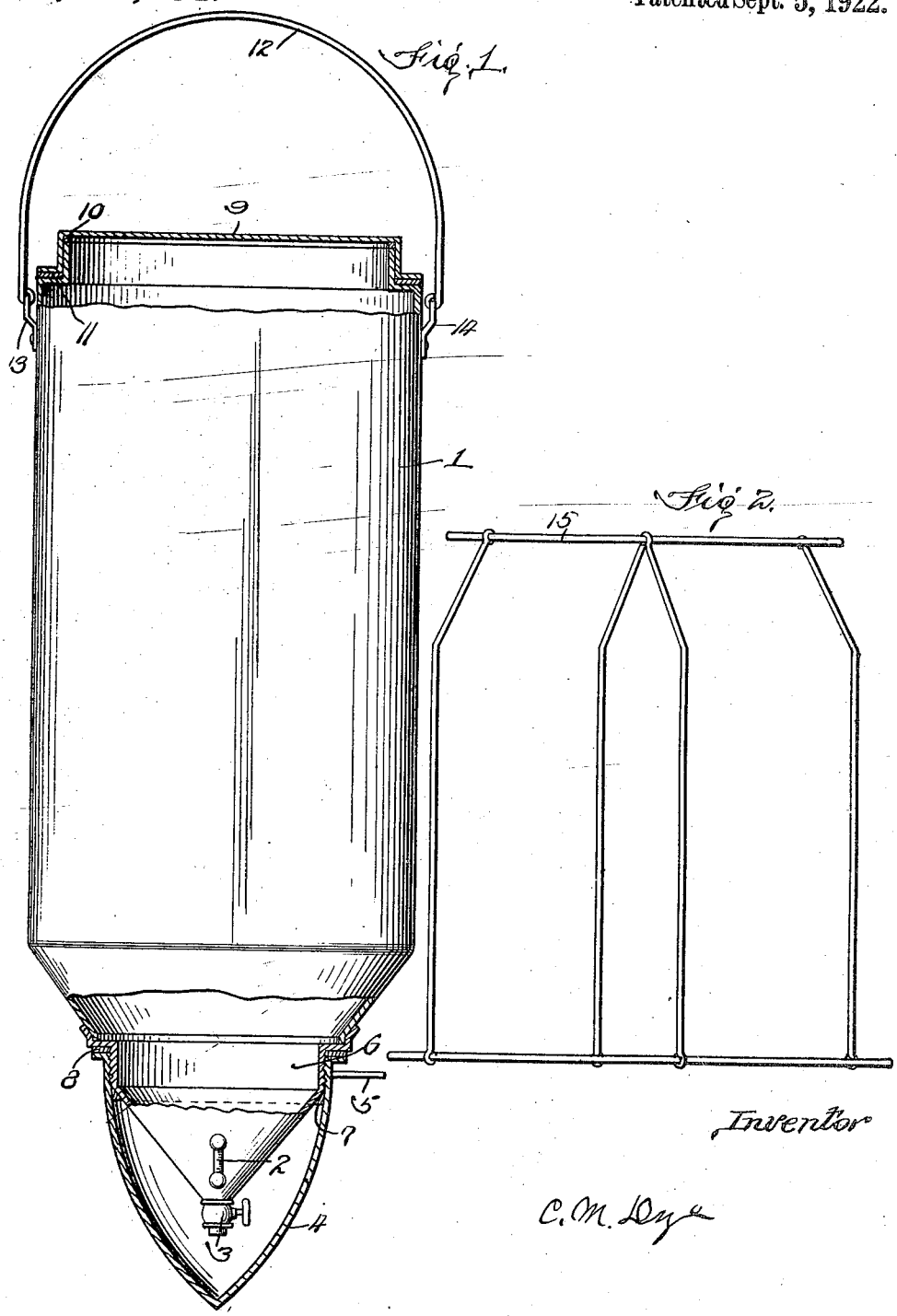

1,428,364

UNITED STATES PATENT OFFICE.

CARTER M. DYE, OF CHRISTOPHER, ILLINOIS.

CREAM SEPARATOR.

Application filed August 20, 1921. Serial No. 494,827.

*To all whom it may concern:*

Be it known that I, CARTER M. DYE, a citizen of the United States, and a resident of Christopher, in the county of Franklin and State of Illinois, have invented new and useful Improvements in Cream Separators, of which the following is a specification.

This invention is one for the purpose of separating cream from milk by the gravity system, and facilitate the work in doing same.

Figure 1 of the drawing herein submitted of the said invention shows the vessel used and all attachments thereto, which after being filled with whole milk is put in a cool place in a vertical position so that the milk goes to the bottom, and cream rises to the top thereof, thereby separating same. Figure 2, of said drawing shows the implement used in holding the vessel shown in Figure 1 for the purpose of drawing off the milk and cream after the separation is complete.

In Figure 1, 1 represents the body of the vessel, which is cylindrical in shape and is made of suitable metal; 2 represents the gauge which is placed on the invention for the purpose of showing the quantity of the milk, as it is drawn from the bottom of the vessel; 3 represents the faucet through which all the milk is drawn into one vessel, after which it is shut off when cream shows in the gauge, and said cream is then drawn off into another vessel; 4 represents a conical cap which fastens to the body of the vessel by means of threads engaging with 6 described below, making an air tight protector for the lower part of the invention including the gauge and faucet; 5 represents a handle or lever which is attached to 4, for the purpose of facilitating the removal of 4; 6 represents a band of heavy suitable metal which is threaded and attached to the lower part of the main body of the invention to facilitate the fastening of 4 to the lower part of the invention as above designated; 7 represents a rubber gasket which fits between the protecting cap, 4, and the lower section of the invention which is conical shape for the purpose of excluding water, air, etc., and the cross section of which is triangular in shape; 8 represents a gasket made of rubber, the cross section of which is rectangular in shape, which fits between the shoulder of 4 and the shoulder of 6 at the point of contact, which excludes all air, water, and other foreign matter; 9 represents the lid or cover for the invention; 10 represents a rubber gasket which is used at the topmost point of contact of the lid or cover, 9, with the main body of the invention; 11 represents a rubber gasket which is used at the lower point of contact between the shoulder of the lid or cover, 9, and the main body of the invention; 12 represents the handle or bail by which device is carried; 13 and 14 represent the eyes to which bale is fastened and which are secured to the main body of the invention by rivets and solder.

In Figure 2, 15 represents the top section of the implement used when removing the cream and milk from the device, and which is round and circular in shape, and to which attachments are made as illustrated in drawing the lower section being similar to the top section except that the circle of same is larger than the top.

In use, the valve is closed, the cap gaskets affixed and the container 1 is filled with milk from the top thereof. The device is then placed in or submerged in a well or cistern. After standing until the cream has separated, the device is removed from the well, and placed on the rack shown in Fig. 2, so that the inclined portion of the base rests on the ring 15. After removing the cap and gaskets, the valve is opened and the milk is drawn into a receptatcle until the cream begins to flow or is visible in the gauge. The receiver is then changed and the cream obtained in a separate receptacle.

I claim—

A device for separating cream from milk comprising a cylindrical container normally open at both ends, closures therefor, gaskets adapted to fit between the container and the closures, one closure containing a faucet, a cap and gasket adapted to be secured over the last mentioned closure whereby the container is rendered leak proof.

Given under my hand this 17th day of August, A. D. 1921.

C. M. DYE.